United States Patent
Gabel et al.

(10) Patent No.: US 7,775,135 B2
(45) Date of Patent: Aug. 17, 2010

(54) MESH CONTROL FOR A RACK AND PINION STEERING SYSTEM

(75) Inventors: Michael J. Gabel, Huntington Woods, MI (US); Michael J. Kostrzewa, Grosse Pointe Woods, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 942 days.

(21) Appl. No.: 11/260,982

(22) Filed: Oct. 28, 2005

(65) Prior Publication Data

US 2007/0137375 A1  Jun. 21, 2007

(51) Int. Cl.
*F16H 1/04* (2006.01)
*F16H 55/18* (2006.01)

(52) U.S. Cl. .......................................... 74/422; 74/409
(58) Field of Classification Search ............... 72/388 PS, 72/396, 406, 409, 411, 422, 498; 384/255, 384/447; 403/326; 24/16 R; 280/93.514
See application file for complete search history.

(56) References Cited

U.S. PATENT DOCUMENTS

| 719,562 | A | | 2/1903 | Brush | |
|---|---|---|---|---|---|
| 1,580,735 | A | * | 4/1926 | Johnson | 384/255 |
| 2,828,721 | A | | 4/1958 | Folkerts | |
| 2,886,355 | A | * | 5/1959 | Wurzel | 403/326 |
| 3,469,494 | A | * | 9/1969 | Frailly | 411/517 |
| 3,535,977 | A | * | 10/1970 | Baumgarten | 411/517 |
| 3,701,303 | A | * | 10/1972 | Kondo | 411/518 |
| 3,820,415 | A | * | 6/1974 | Cass | 74/498 |
| 3,927,576 | A | * | 12/1975 | Colletti | 74/498 |
| 3,979,968 | A | | 9/1976 | Ceccherini | |
| 4,218,933 | A | * | 8/1980 | Allen et al. | 74/422 |
| 4,252,059 | A | * | 2/1981 | Simeth | 101/218 |
| 4,369,669 | A | | 1/1983 | Allen | |
| 4,405,251 | A | * | 9/1983 | Kolchinsky et al. | 403/9 |
| 4,501,191 | A | | 2/1985 | Webber et al. | |
| 4,531,426 | A | | 7/1985 | Iijima | |
| 4,540,059 | A | | 9/1985 | Shibahata et al. | |
| 4,614,127 | A | | 9/1986 | Elser | |
| 4,615,408 | A | | 10/1986 | Cordiano | |
| 4,634,135 | A | | 1/1987 | Nakata et al. | |
| 4,653,339 | A | | 3/1987 | Komatsu et al. | |
| 4,724,714 | A | | 2/1988 | Iwasaki et al. | |
| 4,794,809 | A | | 1/1989 | Kobayashi et al. | |
| 4,887,683 | A | | 12/1989 | Klosterhaus et al. | |
| 5,285,864 | A | | 2/1994 | Martin et al. | |

(Continued)

FOREIGN PATENT DOCUMENTS

EP  1067037 A1 *  1/2001

*Primary Examiner*—Thomas R Hannon
*Assistant Examiner*—Phillip A Johnson
(74) *Attorney, Agent, or Firm*—Joseph E. Root

(57) ABSTRACT

A steering mechanism is provided, including a rack, a rotatable support member, and an automatically-adjustable support member. The rack includes a rack gear portion and the pinion includes a pinion gear portion coupled with the rack gear portion. The rotatable support member is positioned with respect to the rack or the pinion such that rotation of the rotatable support member adjusts an overlap distance between the rack gear portion and the pinion gear portion. The automatically-adjustable support member automatically urges together the rack and the pinion along an urging direction. The urging direction remains substantially constant throughout the rotation of the rotatable support member within a desired angular range.

11 Claims, 2 Drawing Sheets

U.S. PATENT DOCUMENTS

| | | |
|---|---|---|
| 5,313,389 A | 5/1994 | Yasui |
| 5,694,810 A | 12/1997 | Iwasa et al. |
| 5,778,731 A * | 7/1998 | Heep ............................ 74/498 |
| 5,788,399 A * | 8/1998 | Smearsoll ................... 403/327 |
| 5,845,532 A | 12/1998 | Phillips |
| 5,931,046 A | 8/1999 | Phillips |
| 5,934,854 A * | 8/1999 | Krautkremer et al. ....... 411/518 |
| 6,142,031 A | 11/2000 | Phillips |
| 6,247,375 B1 * | 6/2001 | Gierc et al. .............. 74/388 PS |
| 6,283,244 B1 | 9/2001 | Ballester |
| 6,322,276 B1 * | 11/2001 | Liu .............................. 403/31 |
| 6,330,929 B1 | 12/2001 | Gierc et al. |
| 6,427,552 B1 | 8/2002 | Sahr |
| 6,435,050 B1 * | 8/2002 | Tanke et al. ................... 74/422 |
| 6,439,337 B1 | 8/2002 | Ballester |
| 6,467,566 B1 * | 10/2002 | Harer et al. ................. 180/417 |
| 6,568,698 B2 | 5/2003 | Kojima |
| 6,591,706 B2 | 7/2003 | Harer et al. |
| 6,644,430 B2 | 11/2003 | Harer et al. |
| 6,722,465 B2 | 4/2004 | Ballester |
| 2003/0107200 A1 | 6/2003 | Huang et al. |

* cited by examiner

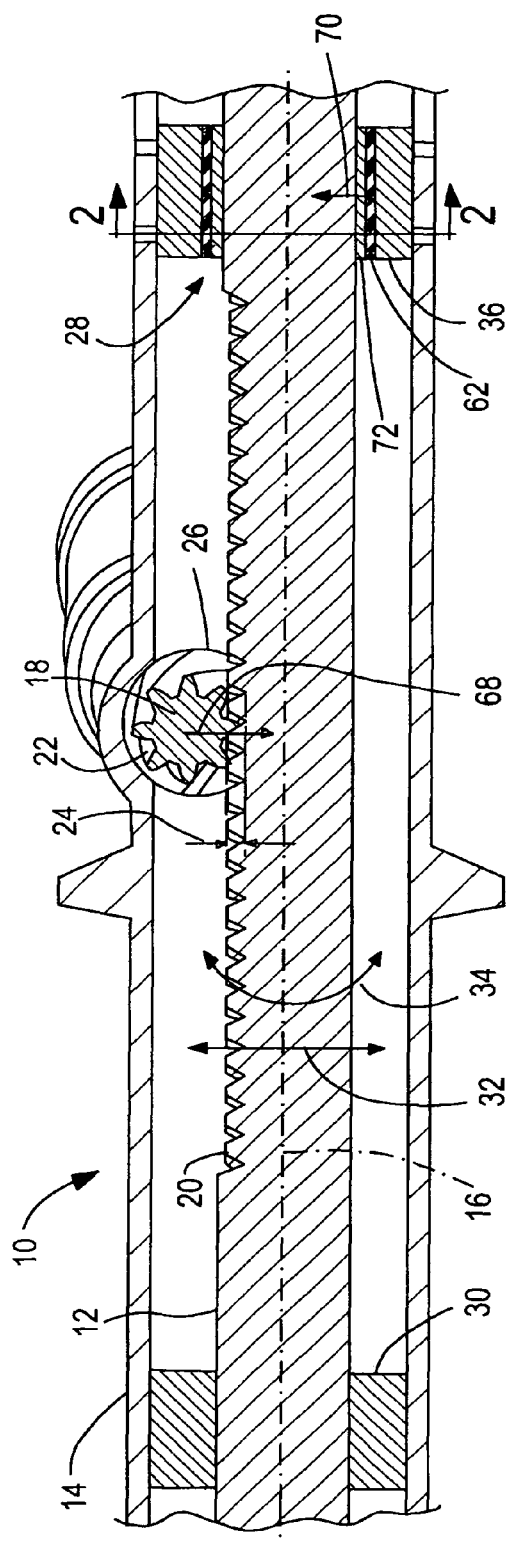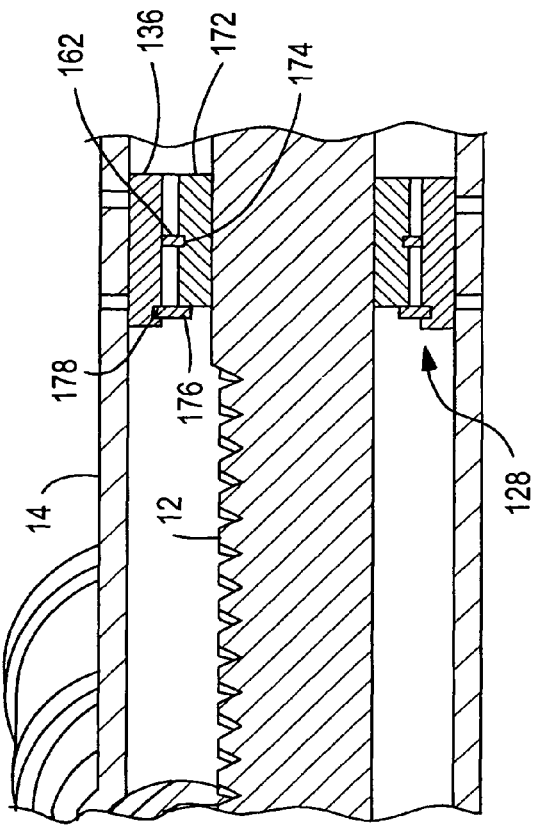

MESH CONTROL FOR A RACK AND PINION STEERING SYSTEM

CROSS REFERENCE TO RELATED APPLICATIONS

Not Applicable.

STATEMENT REGARDING FEDERALLY SPONSORED RESEARCH

Not Applicable.

BACKGROUND OF THE INVENTION

The present invention relates generally to a steering assembly for automotive vehicles, and more particularly to a rack and pinion steering mechanism.

An important requirement for automotive steering mechanisms, particularly rack and pinion power-assisted mechanisms, is offering stable steering means with precise movement between a pinion and a rack bar. This may be accomplished by mounting the pinion and the rack bar within established limits of tolerance in order to provide proper contact points between the gear section of the pinion and the gear section of the rack bar. Sometimes, however, the tolerances vary beyond the established limits and create excessive clearances between the respective gear sections. The correction commonly involves additional complicated and time-consuming operations.

Moreover, the pinion gear section and the rack bar gear section are subject to wear over the life of the vehicle. Wear may be caused by axial stresses that urge the rack into a position distant from, and out of proper assembly with, the pinion. These stresses create a force opposed to maintaining the pinion and rack bar teeth in proper engagement. This wear may create undesirable noise and improper alignment of steering wheel relative to the vehicle.

A first type of correction for improper alignment is manual correction that occurs only during certain periods, such as during the initial vehicle assembly and periodic maintenance.

One such device for manual correction holds the pinion in place with a roller bearing and applies a force to the rack bar with a spring. The spring and the roller bearing combine to urge the pinion and rack bar together into a proper assembled relationship. However, this type of adjustment is mechanically complicated and may be imprecise and costly, both during manufacturing and during servicing of the motor vehicle. Further, the spring may be subject to fatigue.

Another such device for manual correction employs a bushing that is selectively rotatable and eccentric with respect to the pinion. As the bushing is manually rotated, the bushing adjusts the position of the pinion with respect to the rack. The bushing is typically only rotated during periods of manual adjustment, such as during the initial assembly or during periodic maintenance of the steering mechanism. Furthermore, the bushing typically includes a locking mechanism that prevents rotation of the bushing when the rack and pinion assembly is not being aligned.

A second type of correction for improper alignment is automatic correction. Automatic correction may occur during operation of the steering assembly, typically while the vehicle is in operation.

One such device for automatic correction includes a spring-loaded yoke applying a constant force to the rack and pinion and, therefore, urging the two components together. However, this type of adjustment is mechanically complicated and may be imprecise and costly, both during manufacturing and during servicing of the motor vehicle. The spring may additionally be subject to fatigue. Furthermore, if this automatic adjustment device is employed with a manual automatic adjustment device, the spring may become radially misaligned during the manual adjustment. More specifically, if the manual adjustment device is rotated, the automatic adjustment device typically likewise rotates, thereby applying an undesirable force between the rack and the pinion.

It is therefore desirous to improve the relationship between the gear sets of the rack and pinion steering mechanism with simplified manual and automatic support devices that substantially avoid misalignment.

SUMMARY OF THE INVENTION

In overcoming the disadvantages and drawbacks of the known technology, the current invention provides an assembly that improves the alignment between a rack and a pinion in a rack and pinion steering mechanism.

In one aspect a steering mechanism embodying the principles of the present invention includes a rack gear portion and a pinion gear portion coupled with the rack gear portion. Furthermore, a rotatable support member is positioned with respect to the rack or the pinion such that rotation of the rotatable support member adjusts an overlap distance between the rack gear portion and the pinion gear portion. In another embodiment, a manually-adjustable support member is positioned with respect to the rack or the pinion to control the overlap distance. In yet another embodiment, an eccentric sleeve is positioned with respect to the rack or the pinion such as to control the overlap distance. The eccentric sleeve includes an outer surface defining a first centerpoint and an inner surface defining a second centerpoint.

In another aspect of the present invention, the steering mechanism includes an adjustable support member automatically urging together the rack and the pinion along an urging direction. Within a desired angular range, the urging direction remains substantially constant throughout the rotation of the support means. The desired angular range is preferably at least 10 degrees and more preferably at least 30 degrees. In one embodiment, the automatically-adjustable support member is a compliant member having a generally circular cross-section and encircling the rack. The compliant member preferably encircles the bushing and the eccentric member encircles the compliant member.

Further objects, features and advantages of this invention will become readily apparent to persons skilled in the art after a review of the following description, with reference to the drawings and claims that are appended to and form a part of this specification.

BRIEF DESCRIPTION OF THE DRAWINGS

FIG. 1 is a cross-section of a steering mechanism having an eccentric member and a compliant member and embodying the principles of the present invention;

FIG. 3 is a partial cross-section of an alternative embodiment of a steering mechanism having a compliant member received by a bearing encircling the rack and embodying the principles of the present invention.

DETAILED DESCRIPTION OF PREFERRED EMBODIMENTS

Figure 2A:
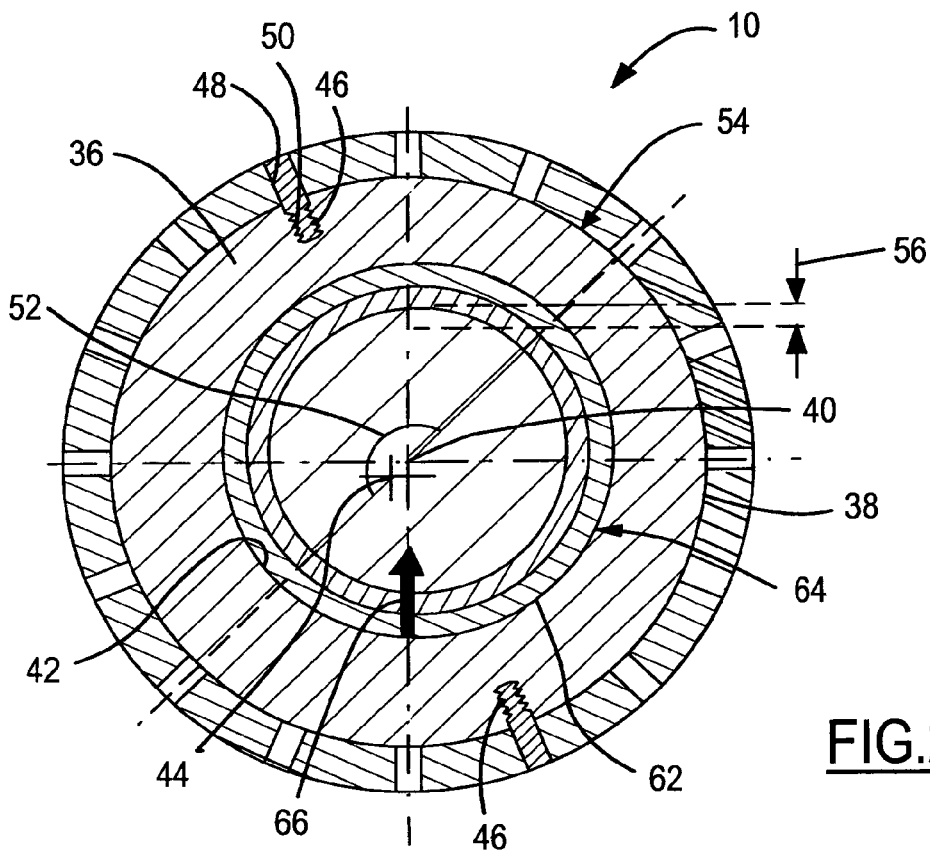
FIG. 2a is a cross-section of the steering mechanism in FIG. 1 taken generally along the line 2-2 and showing the eccentric member in a first position.

Referring now to the drawings, FIG. 1 shows a steering mechanism 10 having a rack 12 received within a housing 14 and configured to move along a central axis 16 with respect to the housing 14. Furthermore, the steering mechanism 10 includes a pinion 18 extending through an opening 26 in the housing 14 and configured to rotate within the opening 26. The pinion 18 engages the rack 12 and its rotation causes the rack to move transversely, with respect to the pinion 18, along the axis 16.

More specifically, the rack 12 includes a rack gear portion 20, having a plurality of teeth 21, the pinion 18 includes a pinion gear portion 22, having a plurality of corresponding teeth 23, and the respective teeth 21, 23 of the gear portions 20, 22 engage each other by an overlap distance 24. Via this engagement, the rotational movement of the pinion 18 is transformed into translational movement of the rack 12.

At its opposite end, the pinion 18 is connected to a steering wheel (not shown) within the vehicle passenger compartment. The rack 12 is pivotably coupled with at least a pair of road wheels (not shown) that contact the driving surface to cause the orientation of the road wheels to change, in other words, to cause the road wheels to turn. Thus, the steering mechanism 10 transforms rotational movement of the steering wheel and the pinion 18 into translational motion of the rack 12 and turning road wheels.

To support the rack 12 within the housing 14, a first bushing assembly 28 is provided toward one end of the rack 12 and a second bushing assembly 30 is provided toward the other end of the rack 12. The first and second bushing assemblies 28, 30 permit the rack 12 to move along the axis 16, during operation of the motor vehicle, but substantially prevent movement thereof in a normal direction 32 thereto or a rotational direction 34.

As mentioned above, it may be necessary or advantageous to adjust the position of the rack 12 with respect to the pinion 18 in the normal direction 32 during assembly of the steering mechanism or during periods of maintenance. This adjustment of the rack 12 adjusts the overlap distance 24 between the respective teeth 21, 23 of the gear portions 20, 22, thus substantially preventing play or slippage and minimizing binding between the respective gear portions 20, 22.

More specifically, if the overlap distance 24 is too small then slippage will occur between the rack 12 and the pinion 18 and the road wheels may exhibit an undesirable degree of non-responsiveness to the movement of the steering wheel. Furthermore, if the overlap distance 24 is too great then binding may occur between the respective gear portions 20, 22, thus inhibiting movement of the steering wheel and/or the road wheels.

In order to manually adjust the overlap distance 24 between the respective gear portions 20, 22 the steering mechanism 10 includes a manually-adjustable support member that can be adjusted during periods of non-use of the motor vehicle, such as during the assembly or maintenance thereof. One such manually-adjustable support member, as shown in FIG. 1, includes, an eccentric sleeve 36, as part of one of the bushings (illustrated in connection with bushing 28) positioned between the rack 12 and the housing 14 and rotatable with respect thereto.

Figure 2B:
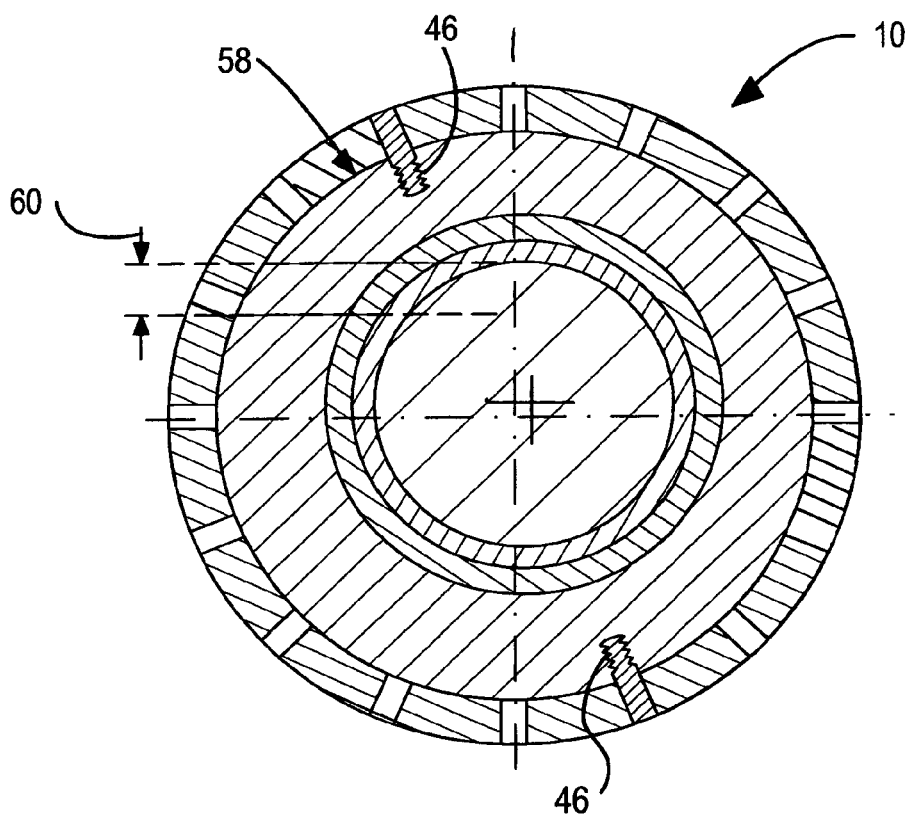
FIG. 2b is a cross-section of the steering mechanism in FIG. 1 taken generally along line 2-2 and showing the eccentric member in a second position.

Referring to FIGS. 2a and 2b, the eccentric sleeve 36 includes an outer surface 38 defining a first center point 40 and an inner surface 42 defining a second center point 44 that is offset from the first center point 40. The outer surface 38 of the eccentric member 36 engages the inner surface of the housing 14. Furthermore, the inner surface 42 of the eccentric member 36 is indirectly coupled with the rack 12 to control the position of the rack 12 with respect to the housing 14 and the pinion 18, as further described below. Therefore, the position of the rack 12 and the overlap distance 24 will vary as the eccentric member 36 rotates.

The eccentric member 36 is selectively fixed relative to the housing 14 by an appropriate fastening means, such as a plurality of fasteners 46 extending through pilot holes 48 in the housing 14 and engaging threaded openings 50 in the eccentric member 36. More specifically, the housing 14 includes a plurality of pilot holes 48 located at various angular positions along the housing 14. Furthermore, the eccentric member 36 includes a pair of threaded openings 50 that can be aligned with two of the pilot holes 48 such that fasteners 46 can be extended through the respective openings 48, 50.

During adjustment of the eccentric member 36, the fasteners 46 are removed and the eccentric member is rotated until the threaded openings 50 are aligned with two of the pilot holes 48 such that the overlap distance 24 is equal to a desired distance. Other fastening means between the housing 14 and the eccentric member 36 may be used, such as a clamping means or a threaded means that permit a locking engagement between the housing 14 and the eccentric member 36 at any angular position therebetween.

The eccentric sleeve 36 has a generally circular outer surface such that the steering mechanism 10 can be rotated 360° within the housing. Furthermore, the eccentric sleeve 36 has a generally circular inner surface having a different centerpoint than the outer surface. Therefore, the overlap distance 24 is changed as the eccentric sleeve 36 is rotated. For example, when the steering mechanism is in a first position 54 (as seen in FIG. 2a) the overlap distance 24 is equal to a first value 56. When the eccentric sleeve 36 is rotated 180° to a second position 58, however, the overlap distance 24 is equal to a second value 60 as shown in FIG. 2b. Furthermore, as the eccentric sleeve 36 is rotated the overlap distance 24 is continuously changing. The housing may have a slot or an opening to permit the rotation of the eccentric sleeve 36.

The manually-adjustable support member may alternatively include an axially-adjustable support member, such as a yoke (not shown) urging the rack 12 into contact with the pinion 18. The axially-adjustable support member may likewise include a locking mechanism to substantially prevent movement of the yoke during operation of the motor vehicle, such as a threaded fastener or a lacking mechanism generally known in the art. Additionally, any other appropriate manually-adjustable support member may be used with the present invention.

Referring back to FIG. 1, the steering mechanism 10 also includes an automatically-adjustable support member located between the rack 12 and the housing 14 and that urges together the rack 12 and the pinion 18 to control the overlap distance 24 therebetween. One embodiment of the automatically-adjustable support member, as shown in FIGS. 1, 2a, and 2b, is a compliant member 62 having a generally circular cross-section 64.

The compliant member 62 urges the rack 12 towards the pinion 18 in an urging direction 66 that is substantially perpendicular to a tangent line drawn along the rack 12 at the point of contact between the rack 12 and the pinion 18. The urging direction 66 remains substantially constant throughout a desired angular range 52 such that the rack 12 and pinion 18 are urged together in a relatively constant direction regardless of the angular position of the eccentric member 36. The compliant member 62 provides a relatively constant urging direction 66 throughout the full rotation of the eccentric sleeve 36 because the compliant member 62 completely encircles the eccentric sleeve 36. Therefore, any point along the circumference of the compliant member 62 is able to urge the rack 12 and pinion 18 together, regardless of the angular position of the compliant member 62.

The compliant member 62 permits movement of the rack 12 with respect to the pinion 18 in the normal direction 32, thereby improving the connection between the respective components 12, 18. More specifically, the compliant member permits the rack 12 to move away from or towards the pinion 18, thereby increasing or decreasing the overlap distance 24, to prevent binding and gear slip between the respective gear portions 20, 22. The compliant member 62 in the figures is a circular, rubber bushing that has a predetermined stiffness such that a force 68 exerted by the pinion 18 onto the rack 12 when the respective components are about to bind-up is large enough to overcome a force 70 by the compliant member 62 acting on the rack 12 in the urging direction 66.

The steering mechanism 10 also includes a bushing 72 located between the rack 12 and the compliant member 62 to prevent premature wearing of the compliant member 62.

Any other appropriate design for the automatically-adjustable support member may be used. For example, an urging member, such as a spring or a plate, extending around the desired angular range 52 of the rack may be used. Also, the desired angular range 52 may be any appropriate range.

The first bushing assembly 28 shown in the figures is located on the driver's side of the steering mechanism 10 and the second bushing assembly 30 is located on the passenger side of the steering mechanism 10. As illustrated, the second bushing assembly 30 does not include an automatically-adjustable support member or a manually-adjustable support member, and therefore the distance between the rack 12 and the housing 14 at the second bushing assembly 30 is relatively constant. Alternatively, however, the second bushing assembly may include an automatically-adjustable support means a manually-adjustable support means, or a pair of support means that are respectively manually-adjustable and automatically-adjustable.

Referring now to FIG. 3, an alternative embodiment of a first bushing assembly 128 of the present invention will now be discussed in more detail. The first bushing assembly 128 shown in FIG. 3 includes an eccentric sleeve 136 and a bushing 172 similar to the respective components described above. The eccentric sleeve 136 and the bushing 172 are located between the housing 14 and the rack 12 to adjust the position of the rack 12 with respect to the pinion 18. The first bushing assembly 128 further includes a compliant member 162 located within a groove 174 in the bushing 172 to separate the eccentric sleeve 136 and the bushing 172 from each other.

The compliant member 162 in this embodiment has an axial length substantially smaller than that of the eccentric sleeve 136 and the bushing 172 to minimize friction between the respective components 136, 172. Furthermore, the first bushing assembly 128 includes a snap ring 176 located within a groove 178 of the eccentric sleeve 136 to prevent axial movement between the eccentric sleeve 136 and the bushing 172.

It is therefore intended that the foregoing detailed description be regarded as illustrative rather than limiting, and that it be understood that it is the following claims, including all equivalents, that are intended to define the spirit and scope of this invention.

What is claimed is:

1. A steering mechanism for an automotive vehicle comprising:
   a rack having a rack gear portion;
   a pinion having a pinion gear portion that overlaps the rack gear portion by an overlap distance;
   a rotatable support member rotatably positioned with respect to at least one of the rack and the pinion, such that rotation of the rotatable support member adjusts the overlap distance;
   an automatically-adjustable compliant support member having a generally circular cross-section, such that any point on the circumference of the automatically-adjustable compliant support member urges the rack and pinion together, regardless of the angular position of the automatically-adjustable compliant support member; and
   a bushing encircling the rack, wherein the compliant member encircles the bushing and the rotatable support member encircles the compliant member.

2. A steering mechanism as in claim 1, the rotatable support member being rotatable to position the pinion with respect to the rack in a first position and a second position, the first position locating the pinion gear portion a first distance relative to the rack, the second position locating the pinion gear portion a second distance relative to the rack.

3. A steering mechanism as in claim 2, the rotatable support member including an eccentric member having an outer surface defining a first center point and an inner surface defining a second center point.

4. A steering mechanism as in claim 3, further comprising a housing rotatably receiving the compliant member, the eccentric member, and the rack, wherein the compliant member encircles the rack, the eccentric member encircles the compliant member, and the housing encircles the eccentric member.

5. A steering mechanism as in claim 4, the bushing including a groove receiving a portion of the compliant member.

6. A steering mechanism as in claim 5, further comprising a snap ring retaining the bushing and the eccentric member with respect to each other.

7. A steering mechanism for an automotive vehicle comprising:
   a rack having a rack gear portion;
   a pinion having a pinion gear portion coupled with the rack gear portion;
   an eccentric member positioned with respect to at least one of the rack and the pinion such as to control an overlap distance between the rack gear portion and the pinion gear portion;
   an automatically-adjustable compliant member having a generally circular cross-section and any point along the circumference of the compliant member automatically urging together the rack and the pinion in a direction that remains substantially constant regardless of an angular position of the eccentric member; and
   a bushing encircling the rack, wherein the compliant member encircles the bushing and the eccentric member encircles the compliant member.

8. A steering mechanism as in claim 7, further comprising a housing rotatably receiving the compliant member, the eccentric member, and the rack, wherein the compliant member encircles the rack, the eccentric member encircles the compliant member, and the housing encircles the eccentric member.

9. A steering mechanism as in claim 8, the compliant member including a rubber sleeve.

10. A steering mechanism as in claim 7, the bushing including a groove receiving a portion of the compliant member.

11. A steering mechanism as in claim 10, further comprising a snap ring retaining the bushing and the eccentric member with respect to each other.

* * * * *